Figure 1:
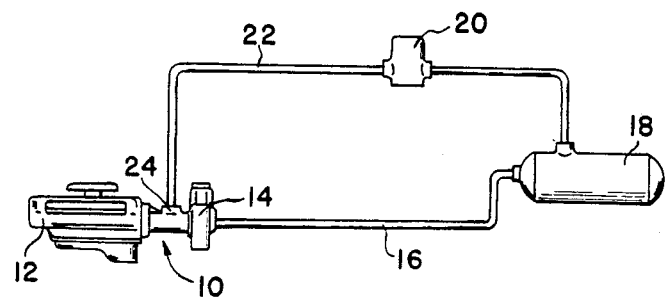

United States Patent [19]

Deem et al.

[11] Patent Number: 4,573,561
[45] Date of Patent: Mar. 4, 1986

[54] DRIVE MECHANISM

[75] Inventors: Brian C. Deem, Avon Lake; John L. Hall, Middleburg Hts., both of Ohio

[73] Assignee: Allied Corporation, Morristown, N.J.

[21] Appl. No.: 507,263

[22] Filed: Jun. 23, 1983

[51] Int. Cl.⁰ .............................................. F16D 13/22
[52] U.S. Cl. ................ 192/91 A; 192/110 B; 74/750 R
[58] Field of Search ............ 192/91 A, 91 R, 110 R; 74/750 R

[56] References Cited

U.S. PATENT DOCUMENTS

| | | | |
|---|---|---|---|
| 2,684,742 | 7/1954 | Eason | 192/91 |
| 3,314,513 | 4/1967 | Lake | 192/91 A |
| 3,804,219 | 4/1974 | Cummings | 192/91 A |
| 3,805,931 | 4/1974 | Portman | 192/91 A |
| 3,893,556 | 7/1975 | Lech | 192/91 A |
| 3,915,269 | 10/1975 | Houser | 192/91 A |
| 4,128,023 | 12/1978 | Kinder | 74/750 R |
| 4,238,017 | 12/1980 | Spokas | 192/82 T |
| 4,245,724 | 1/1981 | Beck | 188/170 |
| 4,361,078 | 11/1982 | Cape | 192/91 A |

FOREIGN PATENT DOCUMENTS

| | | | |
|---|---|---|---|
| 0011390 | 5/1980 | European Pat. Off. | 192/91 |
| 2031458 | 1/1971 | Fed. Rep. of Germany | 192/91 |
| 2540191 | 3/1977 | Fed. Rep. of Germany | 192/91 |

Primary Examiner—Carl Stuart Miller
Attorney, Agent, or Firm—Ken C. Decker; W. N. Antonis

[57] ABSTRACT

A clutch drive mechanism (10) interconnects a vehicle engine (12) with a vehicle air compressor (14) to provide a driving connection therebetween when operation of the air compressor (14) is necessary to charge the vehicle reservoir (18) and to break the driving connection to the air compressor (14) when the reservoir (18) is fully charged. The drive mechanism (10) includes a clutch disc pack (82) which is controlled by a piston (52). Piston (52) responds to a pressure signal from a conventional unloader mechanism (20) to disengage the clutch mechanism (10) to disconnect the air compressor (14) from driving connection with the vehicle engine (12). A thrust bearing (68) provides a rotary connection between the piston (52) and the disc pack (82) and another thrust bearing (46) is provided between the output drive (36) and the clutch drive housing (26) so that axial forces or loads are transmitted to the housing (26) instead of to the compressor (14). These bearings rotate only when the clutch driven mechanism is engaged.

12 Claims, 2 Drawing Figures

DRIVE MECHANISM

This invention relates to a clutch drive mechanism which controls the driving connection between a vehicle engine and an air compressor used to compress atmospheric air to suppy compressed air to, for example, the vehicle braking system.

Large commercial vehicles have been equipped with brakes actuated by compressed air for many years. The compressed air used to operate the braking system of these vehicles is supplied by a vehicle air compressor which is driven by the vehicle engine. Since commercial vehicles often travel long periods of time without requiring a brake actuation, operation of the air compressor is not necessary for significant periods of time. Accordingly, modern vehicle air compressors are equipped with unloading devices, which essentially let the air compressor "freewheel" when the vehicle reservoirs have been charged to a predetermined pressure level. Some power is consumed by the air compressor when it is unloaded, but much less power is consumed when the compressor is unloaded and doing no work than is consumed when the air compressor is compressing air to charge the vehicle reservoir.

One problem with prior art vehicle air compressors is that the air compressor is not disconnected from the vehicle engine when it is unloaded. Accordingly, air compressors wear unnecessarily, and tend to consume oil more quickly than they would if they are disconnected. Furthermore, operation of the air compressor even when unloaded requires energy, thus increasing fuel consumption. Accordingly, a drive mechanism which disconnects the air compressor saves a relatively small, but certainly significant quantity of fuel.

The present invention solves these problems known to the prior art by providing a drive mechanism between the vehicle engine and the vehicle air compressor which disconnects the air compressor from driving engagement by the engine when compressed air is not needed. Although the specific design disclosed herein is intended for use as a drive between a vehicle engine and an air compressor, it will be appreciated that clutches of this type are also useful in many other applications, both in automotive vehicles and on other equipment.

Accordingly, the present invention comprises a drive mechanism comprising a housing defining a bore therewithin, output drive means rotatably supported by said housing for providing an output driving connection, input drive means for providing an input driving connection, clutch means for providing a driving connection between the input drive means and the output drive means when the clutch is engaged and for breaking said driving connection when the clutch is disengaged, resilient means yieldingly engaging said clutch means, means for operating said clutch means, means for communicating fluid pressure to said clutch operating means, characterized in that said clutch operating means include piston means slidably mounted in said bore and movable in response to fluid pressure to engage and disengage said clutch means, first bearing means for providing a connection between the piston means and said clutch means for providing a rotary connection therebetween to permit rotation of the clutch means while the piston means is restricted from rotation, and second bearing means for transmitting the load generated by said resilient means on the clutch means to said housing.

Figure 2:
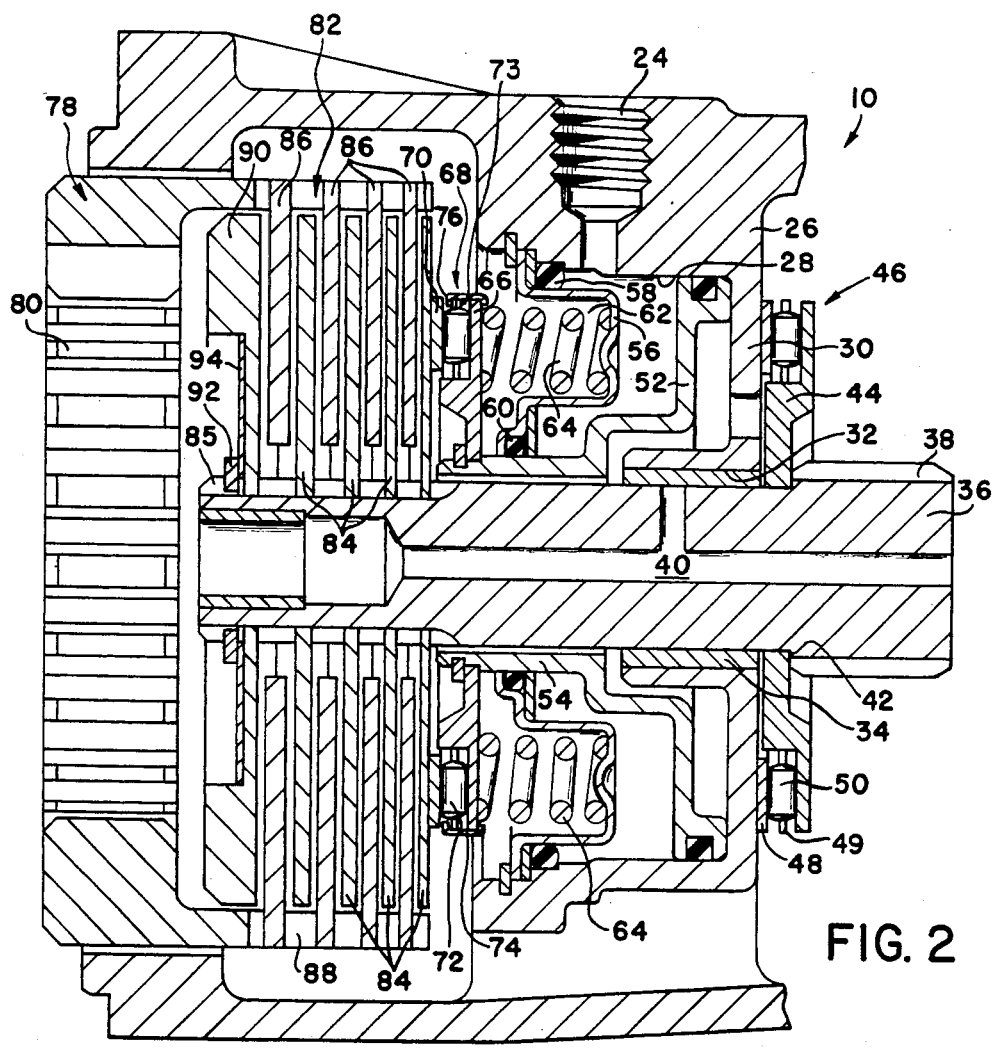

Other features of the invention will become apparent with reference to the following description and drawings, in which:

FIG. 1 is a schematic illustration of a compressor, vehicle engine, drive mechanism, unloading device, and a reservoir showing the connections therebetween; and FIG. 2 is a transverse cross-sectional view of the drive mechanism made pursuant to the teachings of our present invention.

Referring now to the drawing, an air actuated clutch drive mechanism generally indicated by the numeral 10 provides a driving connection between a vehicle engine 12 and a vehicle air compressor illustrated schematically at 14. The output of the compressor 14 is communicated via air line 16 to charge a reservoir 18. A conventional unloading mechanism 20 is responsive to the pressure level in the reservoir 18. The unloading mechanism 20 communicates a pressure signal through a pressure line 22 to the port 24 of the drive mechanism 10 when the pressure level in the reservoir 18 attains a predetermined level.

The drive clutch mechanism 10 includes a housing 26 which defines a bore 28 therewithin which communicates with the inlet port 24. The end of the bore 28 is defined by a web 30 through which an aperature 32 extends. The aperature 32 supports a bearing 34 which in turn supports an outlet drive spindle 36. The output drive spindle 36 is provided with splines 38 for connection to the crank shaft of the air compressor 14. The spindle 36 includes internal passages 40 to communicate lubricating oil from the engine to the compressor and to the bearing 34 and other drive components.

The end of the output drive spindle 36 on which the splines 38 are carried is stepped to define a shoulder 42 which engages a bearing race 44 of a thrust bearing generally indicated by the numeral 46. The thrust bearing 46 further includes another bearing race 48 which engages the web 30 and cooperates with roller cage 49 in the bearing race 44 to retain circumferentially spaced rollers 50.

An annular piston 52 is slidably mounted in the bore 28 and includes axially extending portion 54 which extends coaxially with the output drive spindle 36 and the aperature 32. A circumferentially extending annular retaining member 56 is received in the bore 28 coaxial with piston 54 and output drive spindle 36. A seal 58 provides a sealing connection between the retainer 56 and the wall of the bore 28, and another seal 60 provides a sliding and sealing connection between the retainer 56 and the axially extending portion 54 of the piston 52. The retainer 56 includes a depressed portion 62 which acts as a spring retainer for circumferentially spaced springs 64. The springs 64 bear against bearing race 66 of a thrust bearing generally indicated by the numeral 68. The thrust bearing 68 further includes a circumferentially extending bearing race 70 rotatably engaged with the plate 84 adjacent the bearing 68 which the rollers 72 engage. A roller cage 73 and rollers 72 are retained to the bearing race 66 by a retainer 74 which is carried on the outer diameter of the bearing race 66 and includes a lip 76 which wraps around the outer diameter of the roller cage 73 to thereby assure movement of the roller cage 73 with the bearing race 66 during axial movement of the thrust bearing 68, as will hereafter be described.

Clutch drive mechanism 10 further includes an input drive mechanism or gear generally indicated by the numeral 78 which is provided with internal teeth 80 which mesh with corresponding teeth on the accessory drive of the vehicle engine 12. The gear 78 is connected to the output drive spindle 36 through a disc clutch pack generally indicated by the numeral 82. The disc pack 82 includes clutch discs 84 which are mounted for axial sliding movement along the output drive shaft 36 on splines 85 formed thereon. Disc pack 82 further includes clutch discs 86 which are carried on splines 88 on the input drive mechanism or gear 78. A disc endplate 90 is mounted on the splines 85 and retained in place by a retaining ring 92 and shimmed as at 34 to assure proper engagement of the disc pack 82.

In operation, the conventional unloader mechanism 20, which is well known to those skilled in the art, maintains a pressure signal in the air line 22 whenever the pressure level in the reservoir 18 exceeds a predetermined level. The pressure signal in the air line 22 is communicated through the inlet port 24 into the bore 28, where it acts upon the piston 52, urging the latter to the right viewing FIG. 2 into the position illustrated. Movement of the piston 52 to the right viewing FIG. 2 also carries the thrust bearing 68 in the same direction, away from the clutch disc pack 82 and compressing the springs 64. When the force or load on the disc pack 82 is relieved, the discs 86 can rotate relative to the discs 84, so that the driving connection between the input drive mechanism or gear 78 and the output drive spindle 36 is broken. When the pressure level in the reservoir 18 drops below the predetermined level, the unloading mechanism vents the pressure line 22, thereby exhausting the fluid pressure level in the bore 28. When the pressure in bore 28 acting against piston 52 is exhausted, the springs 64 yieldably urge the thrust bearing 68 to the left viewing FIG. 2, thereby drivingly engaging the clutch discs 84 with the clutch discs 86. Accordingly, the spring 64 maintains the load on the clutch disc pack 82 against the clutch end plate 90, thereby permitting the input drive mechanism or gear 78 to drive the compressor 14 through the output drive spindle 36 and the splined connection 38.

It will be noted that, when the clutch is engaged, the springs 64, acting through the thrust bearing 68 and the clutch disc pack 82, exert substantial axial loads on the output drive spindle 36. These axially directed loads are transmitted to the housing 26 through the thrust bearing 46 and the web portion 30. If these axial loads were transmitted to the drive mechanism of the air compressor 14, the durability of the air compressor would be affected, since the axially directed loads would aversely affect the wear of the bearing and other drive components of the compressor. However, because of thrust bearing 46, these axially directed loads are taken by the housing 26 instead. It will also be noted that none of the seals necessary in the clutch mechansim 10 rotate, and that the components of the thrust bearings 46 and 68 rotate only when the clutch is engaged, thus extending the life of these components.

We claim:

1. Drive mechanism comprising a housing defining a bore therewithin, output drive means rotatably supported by said housing for providing an output driving connection, input drive means for providing an input driving connection, clutch means for providing a driving connection between the input drive means and the output drive means when the clutch means is engaged and for breaking said driving connection when the clutch means is disengaged, resilient means yieldably engaging said clutch means, means for operating said clutch means, and means for communicating fluid pressure to said clutch operating means, said clutch means including clutch discs slidably mounted on said input and output drive means, abutment means carried by one of said drive means for engagement by said clutch discs, said resilient means forcing said clutch discs into driving engagement with each other and said abutment means to provide a driving connection between said input and output drive members, said clutch operating means including piston means slidably mounted in said bore and movable in response to fluid pressure to engage and disengage said clutch discs by controlling said resilient means, first bearing means for providing a rotary connection between the piston means and said clutch discs to permit rotation of the clutch discs while the piston means is restricted from rotation, and second bearing means between said one drive means and said housing for transmitting to said housing the load generated by said resilient means on said one drive means through said clutch discs.

2. Drive mechanism as claimed in claim 1, wherein said piston means and said output drive means are coaxial.

3. Drive mechanism as claimed in claim 1, wherein said piston means, output drive means, and said bore are coaxial, said housing defining an aperature coaxial with the bore and extending through said housing for receiving the output drive means, and means for rotatably supporting said output drive means in said aperature.

4. Drive mechanism as claimed in claim 3, wherein an annular member carried on said housing closes said bore to define a pressure chamber between the piston means and one side of said annular member, the opposite side of the annular member defining a seat for said resilient means.

5. Drive mechanism as claimed in claim 4, wherein said first bearing means is a thrust bearing located between the clutch means and said annular member, and said resilient means is disposed between the annular member and the thrust bearing.

6. Drive mechanism as claimed in claim 5, wherein said piston means includes an axially extending portion coaxial with the output drive means, said annular member defining an inner circumferential surface sealingly engaged with the axially extending portion of the piston, said first bearing means being carried on said axially extending portion of the piston.

7. Drive means as claimed in claim 1, wherein said housing includes a web defining one end of said bore, said aperature extending through said web, said second bearing means being a thrust bearing carried by the output drive means and providing a rotary connection between the latter and said web for transmitting thrust from the output drive means to said web.

8. Drive means as claimed in claim 1, wherein an annular member carried on said housing closes said bore to define a pressure chamber between the piston means and one side of said annular member, the oppoiste side of the annular member defining a seat for said resilient means.

9. Drive means as claimed in claim 3, and passage means extending through said output drive means for communicating lubricant to said clutch means, to said first and second bearing means and to rotatably supporting means.

10. Drive mechanism for drivingly connecting an accessory to an engine so that the accessory can be engaged and disengaged from being driven by the engine, said accessory having a housing, said drive mechanism including an input drive means drivingly engaged with the engine, an output drive means rotatably supported by said housing for driving said accessory, clutch means for controlling engagement and disengagement of the input drive means and the output drive means, said clutch means including clutch discs slidably mounted on said input and output drive means, abutment means carried by one of said drive means for engagement by said clutch discs, said resilient means forcing said clutch discs into driving engagement with each other and said abutment means to provide a driving connection between said input and output drive members, fluid pressure responsive piston means for controlling engagement and disengagement of said clutch discs, means for communicating a pressure signal to said pressure responsive piston means for actuating said clutch discs by controlling said resilient means, first bearing means for providing a rotary connection between the piston means and the clutch discs to permit rotation of the clutch discs while the piston means is restricted against rotation, and second bearing means between said one drive means and said housing for transmitting to said housing the loads generated by said resilient means on said one drive means through said clutch discs.

11. Drive mechanism as claimed in claim 10, wherein said accessory is an air compressor which charges a reservoir, said pressure signal communicating means including mechanism responsive to the pressure level in said reservoir to operate said piston means to cause said clutch means to engage and disengage.

12. Drive mechanism as claimed in claim 10, wherein said housing defines a bore slidably receiving said piston means, an annular member carried on said housing closing said bore to define a pressure chamber between the piston and one side of said annular member, the opposite side of the annular member defining a seat for the resilient means.

* * * * *